United States Patent [19]
Credelle et al.

[11] 4,174,881
[45] Nov. 20, 1979

[54] RECORDING A SYNTHETIC FOCUSED-IMAGE HOLOGRAM ON A THERMALLY DEFORMABLE PLASTIC

[75] Inventors: Thomas L. Credelle, East Windsor; Fred W. Spong, Lawrenceville, both of N.J.

[73] Assignee: RCA Corporation, New York, N.Y.

[21] Appl. No.: 822,625

[22] Filed: Aug. 8, 1977

Related U.S. Application Data

[63] Continuation-in-part of Ser. No. 664,198, Mar. 5, 1976, abandoned.

[51] Int. Cl.² ............................................. G02B 27/00
[52] U.S. Cl. .................................. 350/3.63; 350/3.84; 350/162 R; 350/360
[58] Field of Search ................... 350/3.61, 3.62, 3.63, 350/3.66, 3.84, 162 R, 360

[56] References Cited

U.S. PATENT DOCUMENTS

| | | | |
|---|---|---|---|
| 3,196,011 | 7/1965 | Gunther et al. | 350/360 X |
| 3,526,879 | 9/1970 | Gundlach et al. | 350/360 X |
| 3,560,206 | 2/1971 | Jvirblis | 350/162 R X |
| 3,669,673 | 6/1972 | Ih et al. | 350/3.66 X |
| 3,716,359 | 2/1973 | Sheridon | 350/360 X |
| 3,795,514 | 3/1974 | Jvirblis et al. | 350/3.63 X |
| 3,821,722 | 6/1974 | Ost | 350/3.63 |
| 3,961,836 | 6/1976 | Knop | 350/3.84 |
| 3,997,238 | 12/1976 | Oride et al. | 350/3.63 |
| 4,085,501 | 4/1978 | Currie | 350/162 R X |

Primary Examiner—John K. Corbin
Assistant Examiner—John D. Lee
Attorney, Agent, or Firm—H. Christoffersen; Joseph D. Lazar

[57] ABSTRACT

A synthetic focused image hologram of a white light image is recorded as variations in the depths of grooves of a diffraction grating in a layer of thermoplastic material located on a layer of photoconductive material. The thermoplastic layer is manufactured with initial, uniform, shallow grooves of the diffraction grating. A voltage is applied across the layers to deposit a uniform charge, a white-light image is projected on the thermoplastic layer, the layers are recharged and the thermoplastic layer is heated, whereby the initial shallow grooves are selectively deepened in accordance with the image.

1 Claim, 11 Drawing Figures

RECORDING A SYNTHETIC FOCUSED-IMAGE HOLOGRAM ON A THERMALLY DEFORMABLE PLASTIC

CROSS REFERENCE TO RELATED APPLICATIONS

This is a continuation-in-part of the patent application having Ser. No. 664,198 filed Mar. 5, 1976, now abandoned.

BACKGROUND OF THE INVENTION

1. Field of Invention

This invention relates to holography and more particularly to synthetic focused image holograms.

2. Description of the Prior Art

A thermoplastic recording medium, for recording a hologram of an image, typically includes a thermoplastic layer on a photoconductor layer. The thermoplastic is a dielectric which becomes soft, and therefore deformable, in response to an application of heat. The photoconductor is a dielectric having a conductivity that increases with the intensity of light transmitted thereto.

To record what is known as a synthetic focused image halogram, a uniform voltage is applied across the thermoplastic and the photoconductor, thereby charging the thermoplastic and the photoconductor. The uniform voltage establishes uniform electric fields within the photoconductor and the thermoplastic. After the uniform electric fields are established, the charging is discontinued.

The charged photoconductor is exposed to a pair of beams of coherent light, the coherent light beams interacting upon the photoconductor to form a uniform interference pattern. Concurrent with the exposure to the coherent light, the photoconductor is exposed to a white light image. Within the photoconductor, there is a pattern of conduction corresponding to the white light image superimposed upon the interference pattern. The conduction causes a decrease of the intensity of the electric field within the photoconductor in a corresponding pattern.

After the concurrent exposures, the uniform voltage is applied across the thermoplastic and the photoconductor to recharge them. The recharging causes the intensity of the electric field within the thermoplastic to be representative of a desired diffraction grating comprising the synthetic focused image hologram.

The surfaces of the thermoplastic are attracted to each other by an electrostatic force proportional to the square of the intensity of the electric field within the thermoplastic. When the electric field is representative of the desired diffraction grating, the thermoplastic is softened by an application of heat. The force of attraction deforms the thermoplastic, the deformation comprising the synthetic focused image hologram.

In the prior art, a complex arrangement of optical elements, including a laser source of coherent light, is used to record the synthetic focused image hologram. It is desirable to record the synthetic focused image hologram with a simple arrangement of optical elements that does not include the laser source.

SUMMARY OF THE INVENTION

A first aspect of the present invention is a recording medium that includes a layer of a thermally deformable dielectric material having a surface deformation that is a substantially uniform diffraction grating.

A second aspect of the present invention is a method of recording a synthetic focused image hologram, including the steps of: forming a uniform diffraction grating on a surface of a thermally deformable dielectric layer of a recording medium; charging the layer to provide therein an electric field representative of a white light image; and heating the layer to cause a softening thereof, whereby grooves of the grating are deepened by a force of attraction between surfaces of the softened layer.

DESCRIPTION OF THE PREFERRED EMBODIMENT

Figure 1:
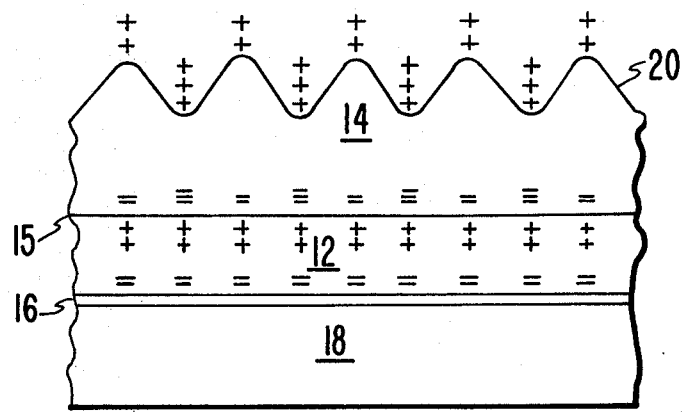
FIG. 1 is a side elevation of a segment of a recording medium in accordance with a first embodiment of the present invention.

Referring to FIG. 1, in a segment of a recording medium according to a first embodiment of the present invention, a thermoplastic layer 14 is disposed upon a photoconductor layer 12 with a boundary 15 therebetween. The photoconductor 12 is disposed upon a conductor layer 16 which is typically made from tin oxide. In this embodiment and embodiments described hereinafter, photoconductor layers and thermoplastic layers have substantially equal dielectric constants.

The layers 12, 14, 16 form a structure having a thickness of about two microns. Because they are so thin, the layers 12, 14, 16 are not self-supporting. The photoconductor 12 is carried by a substrate 18 that supports the layers 12, 14, 16.

The thermoplastic 14 has a top exposed free surface 20 with an initial deformation formed by embossing or in any other suitable manner. The deformation is a uniform, weak diffraction grating. As explained hereinafter, grooves of the deformation in surface 20 are deepened in direct relation to the intensity of rays of a white light image, whereby a focused image hologram of the light image is recorded.

A corona charger is connected to apply a uniform positive voltage to the surface 20 with respect to the conductor 16, thereby charging the photoconductor 12 and the thermoplastic 14. The charging establishes electric fields within the photoconductor 12 and the thermoplastic 14. The corona charger is disconnected after the charging.

It should be understood that when the uniform voltage is applied to the surface 20, the intensity of the electric field in the thermoplastic 14 is greatest in grooves of the thermoplastic 14 where the surface 20 and the boundary 15 have a close spacing, and is the least between the peaks of the grooves and the boundary 15. Additionally, between the surface 20 and the boundary 15 there is an electrostatic force of attraction proportional to the square in the intensity of the electric field in the thermoplastic 14.

It should be understood that the thermoplastic 14 is equivalent to two groups of capacitors connected in parallel. A first group of capacitors corresponds to portions of the thermoplastic 14 where the surface 20 and the boundary 15 have the close spacing. A second group of capacitors corresponds to the portions of the thermoplastic 14 between adjacent grooves and the boundary 15 that do not have the close spacing. Because of the spacings, the capacitors of the first group have a higher capacitance than the capacitors of the second group. Therefore, the application of the uniform voltage causes a greater charge to accumulate in the grooves of the surface 20 than elsewhere on the surface 20.

Figure 2:
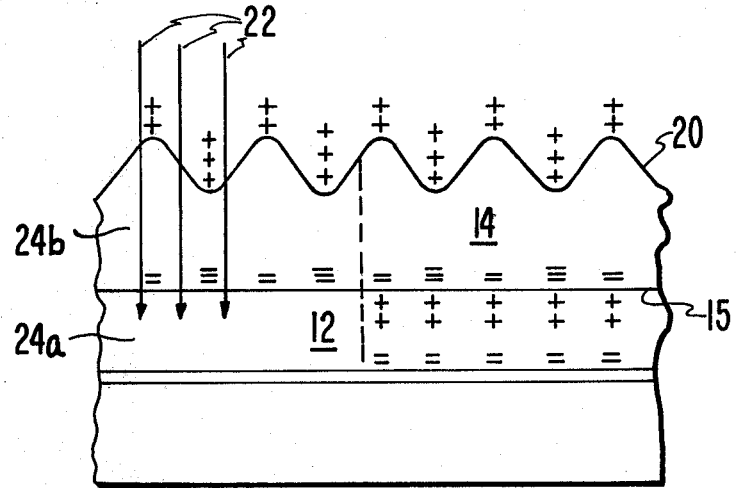
FIG. 2 is a schematic showing of an exposure to light of a photoconductor layer in the segment of FIG. 1.

Referring to FIG. 2, rays 22 are exemplary of a white light image which is transmitted to a region 24a of the photoconductor 12, thereby exposing the photoconductor 12. Adjacent to the region 24a is a region 24b of the thermoplastic 14. As explained hereinafter the regions 24a, 24b are equivalent to a pair of capacitors with a common terminal.

Since the conductivity of the photoconductor 12 increases with the intensity of light transmitted thereto, the exposure of the photoconductor 12 causes a decrease of the intensity of the electric field in the region 24a; the electric field in the thermoplastic 14 remains unchanged. In other words, before the exposure of photoconductor 12, the regions 24a, 24b are equivalent to two charged capacitors with a common terminal (part of the boundary 15). One capacitor (equivalent to the region 24a) is discharged by the exposure of the photoconductor 12, the other capacitor (equivalent to the region 24b) remaining charged.

Figure 3:
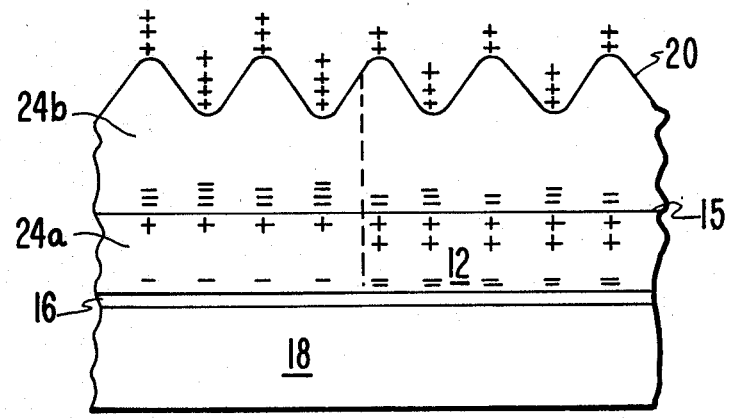
FIG. 3 is a schematic showing of a distribution of charge in the segment of FIG. 1.

Referring to FIG. 3, after the exposure of the photoconductor 12, the corona charger is connected to reapply the uniform voltage as described hereinbefore. Because of the decrease of the electric field in the region 24a, the reapplication of the uniform voltage causes an increase in charge density on the surface 20 in the region 24b and a corresponding increase in the intensity of the electric field in the region 24b. In other words, the reapplication of the uniform voltage recharges the surfaces of the region 24a and increases the charge on the surfaces of the region 24b; the recharging and the increase of the charge are directly proportional to the discharge of the region 24a during the exposure of the photoconductor 12.

The corresponding increase in the intensity of the electric field in the region 24a causes the electric field in the thermoplastic 14 to be representative of the transmitted light. In an alternative embodiment, the uniform positive voltage is maintained between the surface 20 and the conductor 16 during the exposure of the photoconductor 12.

Figure 4:
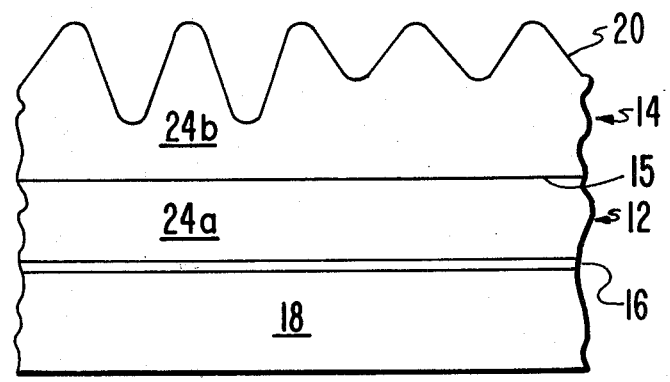
FIG. 4 is a side elevation of the segment of FIG. 1 with a diffraction grating caused by the exposure of FIG. 2.

Referring to FIG. 4, after the reapplication of the uniform voltage, heat is applied to the thermoplastic 14 to cause a softening thereof, whereby the force of attraction between the surface 20 and the boundary 15 deepens the grooves in the surface 20. Since the force of attraction between the surface 20 and the boundary 15 is proportional to the square of the electric field in the thermoplastic 14, the deepened grooves in the surface 20 comprises a synthetic focused image hologram of the transmitted light. Accordingly, in the region 24b, the grooves are deeper than elsewhere in the surface 20.

A light image is typically formed by light transmitted through a photographic transparency. Therefore, the light image is comprised of light rays having differing intensities. Hence, when the photoconductor 12 is exposed to the light image and the uniform voltage is applied as described hereinbefore, heating the thermoplastic 14 causes the grooves in the surface 20 to be deepened in direct relation to the intensity of the rays of the light image; the deepened grooves comprise a recording of the synthetic focused image hologram of the light image.

Figure 5:
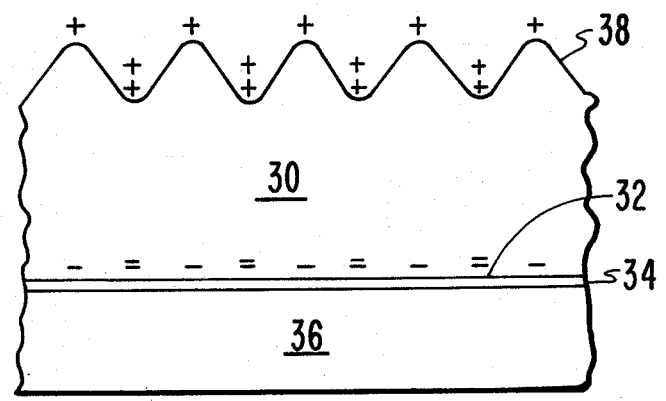
FIG. 5 is a segment of a recording medium in accordance with a second embodiment of the present invention.

Referring to FIG. 5, in a second embodiment of the present invention, a photoplastic layer 30 is disposed upon a conductor layer 34 (similar to the conductor 16) with a boundary 32 therebetween. The photoplastic 30 is comprised of thermoplastic with a photoconducting material dissolved therein whereby the photoplastic 30 is a thermally deformable photoconductive plastic. The layer 30 is carried by a supporting substrate 36, similar to the substrate 18.

The photoplastic 30 has a surface 38 with a deformation that is a uniform, weak diffraction grating (similar to the deformation of the surface 20 in the first embodiment). As explained hereinafter, grooves of the deformation in the surface 38 are deepened in inverse relation to the intensity of the rays of the light image thereby recording a negative type of synthetic focused image hologram of the light image.

The corona charger is connected to apply the uniform voltage to the surface 38 with respect to the conductor 34, thereby establishing an electric field within the photoplastic 30 (similar to the electric fields described in connection with FIG. 1.) When the electric field is established, the corona charger is disconnected. Between the boundary 32 and the surface 38 there is an electrostatic force of attraction proportional to the square of the intensity of the electric field in the photoplastic 30.

Figure 6:
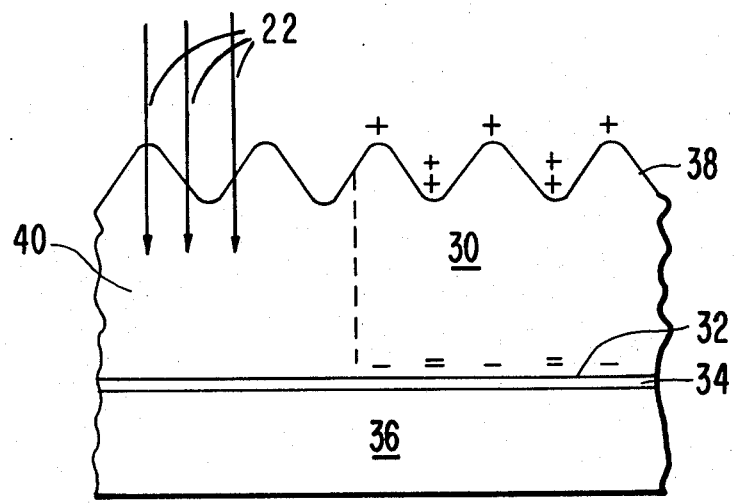
FIG. 6 is a schematic showing of an exposure to light of a photoplastic layer in the segment of FIG. 5.

Referring to FIG. 6, the rays 22 are transmitted to the photoplastic 30 in a region 40 thereof, whereby the photoplastic 30 is exposed. Since the photoplastic 30 has a conductivity that increases with the intensity of light transmitted thereto, the exposure of the photoplastic 30 causes a decrease in the intensity of the electric field within the region 40.

Figure 7:
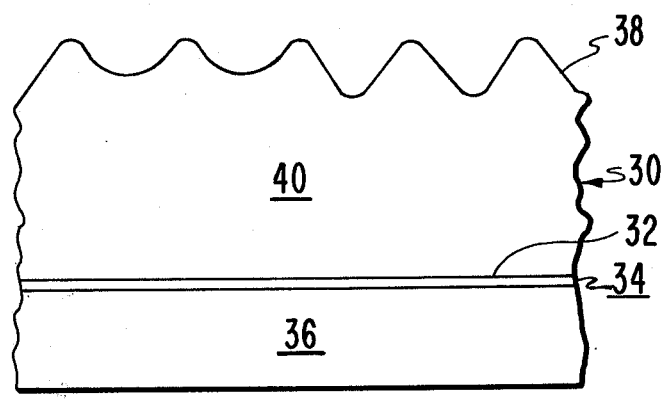
FIG. 7 is a side elevation of the segment of FIG. 5 with a diffraction grating caused by the exposure of FIG. 6.

Referring to FIG. 7, heat is applied to the exposed photoplastic 30 to cause a softening thereof, whereby the force of attraction between the boundary 32 and the surface 38 deepens the grooves in the surface 38. Since the force of attraction between the boundary 32 and the surface 38 is proportional to the square of the electric field in the photoplastic 30, the deepened grooves in the surface 38 comprise a negative type of synthetic focused image hologram of the transmitted light. Accordingly, in the region 40 the grooves are more shallow than elsewhere on the surface 38. Hence, when the light image is used for exposing the photoplastic 30, the grooves in the surface 38 comprise a negative type of a synthetic focused image hologram of the light image.

Figure 8:
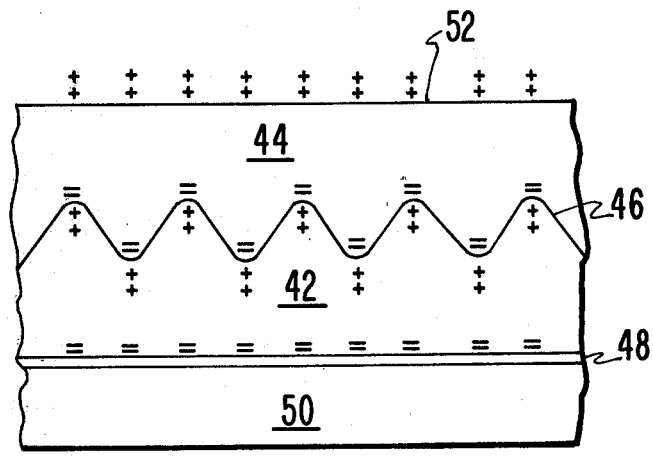
FIG. 8 is a side elevation of a segment of a recording medium in accordance with a third embodiment of the present invention.

Referring to FIG. 8, in a third embodiment of the present invention, a thermoplastic layer 44 is disposed upon a photoconductor layer 42, with a boundary 46 therebetween. Additionally, the photoconductor 42 is disposed upon a conductor layer 48 (similar to the conductor 16) carried by a supporting substrate 50 (similar to the substrate 18).

The boundary 46 is a uniform, weak diffraction grating, similar to the uniform, weak diffraction gratings described in connection with the first and second embodiments. The boundary 46 may be formed by first embossing the uniform diffraction grating on the photoconductor 42 and then coating the photoconductor 42 with the thermoplastic 44. As explained hereinafter, on a top exposed surface 52 of the thermoplastic 44 there is recorded a synthetic focused image hologram, similar to the hologram of the first embodiment.

The corona charger is connected to apply the uniform voltage to the surface 52 with respect to the conductor 48 thereby establishing electric fields in the photoconductor 42 and in the thermoplastic 44; after the electric fields are established, the corona charger is disconnected.

Figure 9:
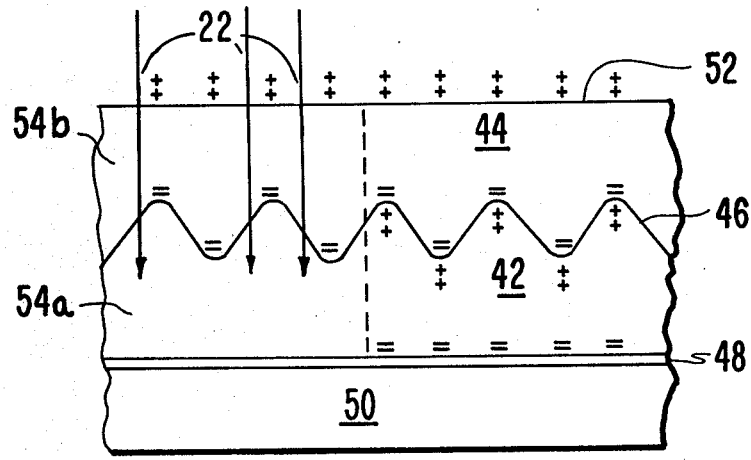
FIG. 9 is a schematic showing of an exposure to light of a photoconductor layer in the segment of FIG. 8.

Referring to FIG. 9, the rays 22 are transmitted to the photoconductor 42 in a region 54a thereof, thereby exposing the photoconductor 42. Adjacent to the region 54a is a region 54b of the thermoplastic 44. The regions 54a, 54b are analogous to the regions 24a, 24b, respectively, described in connection with the first embodiment.

Since the conductivity of the photoconductor 42 increases with the intensity of light transmitted thereto, the exposure of the photoconductor 42 causes a decrease of the intensity of the electric field in the region 54a; the electric field in the thermoplastic 44 remains unchanged.

Figure 10:
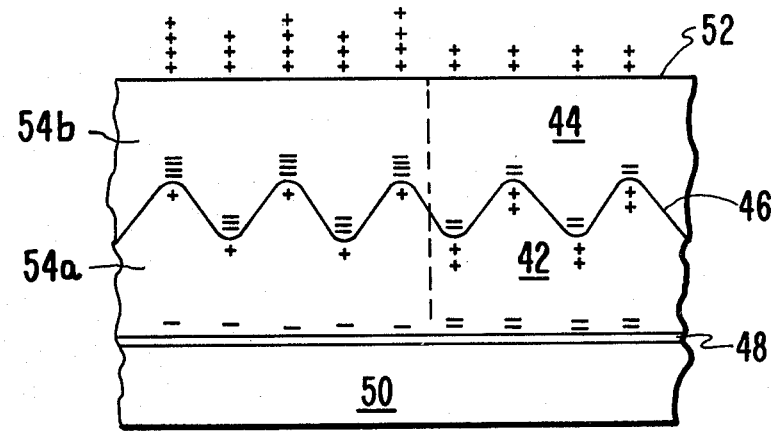
FIG. 10 is a schematic showing of a distribution of charge in the segment of FIG. 8.

Referring to FIG. 10, after the exposure of the photoconductor 42, the corona charger is reconnected to apply the uniform voltage to the surface 52 with respect to the conductor 48, thereby increasing the intensity of the electric field in the region 54b (similar to the increase in the intensity of the electric field in the region 24b described in connection with FIG. 3 in the first embodiment). Similar to the first embodiment, the reapplication of the uniform voltage causes greater charge to accumulate on the surface 52 where the surface 52 and the boundary 46 are closely spaced; lesser charge is accumulated elsewhere on the surface 52. The boundary 46 and the surface 52 have an electrostatic force of attraction therebetween proportional to the square of the intensity of the electric field in the thermoplastic 44.

Figure 11:
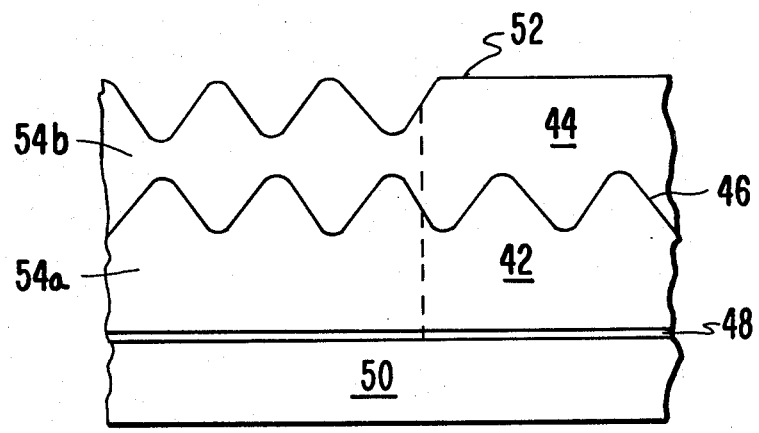
FIG. 11 is a side elevation of the segment of FIG. 8 with a diffraction grating caused by the exposure of FIG. 9.

Referring to FIG. 11, heat is applied to the thermoplastic 44, thereby causing the thermoplastic 44 to soften. Within the softened thermoplastic 44, the force of attraction between the boundary 46 and the surface 52 provides grooves in the surface 52 comprising the synthetic focused image hologram of the transmitted light. Unlike the grooves in the surfaces 20, 38 (FIGS. 4 and 7) there are grooves in the region 54b, and an absence of grooves in the unexposed portion of the surface 52. Moreover, when the light image is used for exposing the photoconductor 42, the grooves in the surface 52 are deepened in direct relation to the intensity of the rays of the light image.

When a hologram is in the surface 20 (FIG. 4), the initial deformation remains in the region of surface 20 where there was no exposure to light. Because the initial deformation remains, there is a reduced ratio between the depth of the grooves in an exposed region of surface 20 and the depth of the grooves in an unexposed region of surface 20. The reduced ratio between the grooves causes the hologram in surface 20 to have a reduced contrast ratio. The contrast ratio of the hologram in surface 20 is defined as an amount of light that is diffracted by the exposed region of surface 20 divided by an amount of light that is diffracted by the unexposed region of surface 20.

Correspondingly, when a hologram is in the surface 38 (FIG. 7) a deformation remains in the region 40 (where the photoplastic 30 is exposed). Accordingly, the hologram in the surface 38 has a reduced contrast ratio for reasons similar to those given in connection with the hologram in the surface 20. As explained hereinafter, the hologram in surface 52 has a higher contrast ratio.

In the third embodiment, the thermoplastic 44 (FIG. 9) and the photoconductor 42 have substantially equal indices of refraction. The substantially equal indices of refraction prevents a diffraction of light at the boundary 46. Since there is an absence of grooves in the unexposed portion of the surface 52 and no diffraction of light at the boundary 46, the hologram in the surface 52 has a higher contrast ratio than the holograms in the surfaces 20, 38.

What is claimed is:

1. In an image recording medium for improving the contrast ratio of a synthetic focused image hologram produced by a white light image, said medium including a conductor layer carried by a substrate, the improvement comprising:

a photoconductor layer disposed upon said conductor layer; and a thermoplastic layer having an index of refraction substantially equal to the index of refraction of said photoconductor layer, one face of said thermoplastic layer being disposed upon said photoconductor layer to form a boundary therebetween that has a deformation in the shape of a uniform diffraction grating;

the other face of said thermoplastic layer opposite from said boundary having a deformation corresponding to an image of said white light;

whereby the contrast ratio of said hologram on said other face of said thermoplastic layer is improved by the substantial absence of diffraction of light from said barrier defined by said layers having substantially equal indices of refraction.

* * * * *